Figure 1:
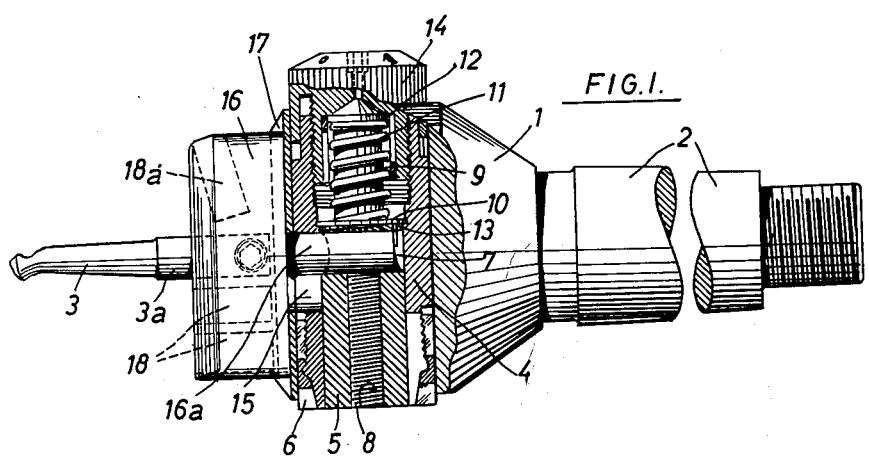

Dec. 11, 1962     R. BREUNING     3,067,636
BORING HEAD
Filed April 4, 1960

INVENTOR:
Robert Breuning
By
                  Attorney

United States Patent Office 3,067,636
Patented Dec. 11, 1962

3,067,636
BORING HEAD
Robert Breuning (% Mr. Carl Hauser, Königstrasse 40, Stuttgart, Germany), Besigheim, Neckar, Germany
Filed Apr. 4, 1960, Ser. No. 19,805
Claims priority, application Germany Apr. 30, 1959
2 Claims. (Cl. 77—58)

The present invention relates to a boring head for clamping a cutting tool and for adjusting its position in a direction at right angles to the axis of rotation of the boring head.

In the conventional boring heads of this type, the cutting tool is clamped between two gripping members which are threadedly adjustable relative to each other in a threaded transverse bore in the boring head. For adjusting the cutting tool to a different position parallel to the axis of the boring head, it is therefore necessary to loosen one gripping member for the required distance and to tighten the other accordingly. This procedure does not permit any accurate adjustment of the cutting tool, and even an approximate adjustment requires a considerable length of time.

It is an object of the present invention to provide a boring head in which the cutting tool may be adjusted very quickly, extremely accurately, in a very simple manner, and entirely without any play during the adjusting operation.

For attaining this object, the boring head is provided with a tool-holding shaft which is mounted in a colletlike sleeve which is inserted into the boring head and extends transversely through the same. This mounting shaft is adjustable under the action of a spring in the longitudinal direction of the sleeve, that is, transversely to the axis of the boring head, and it is provided with a bore which extends at a right angle to the direction of adjustment for receiving the shaft of the cutting tool. This bore merges into an elongated guide slot which extends transversely thereto within the sleeve and in the front wall of the boring head, and has a length in accordance with the desired extent of adjustment of the mounting shaft.

More specifically, the device may be designed in such a manner that a spring which rests on a shoulder on the sleeve acts upon the mounting shaft to hold it in engagement with a control member which may be screwed to different depths into the sleeve.

In order to attain a large range of adjustment of the cutting tool while only requiring a very small range of adjustment of the mounting shaft, the invention further provides that instead of securing the shaft of the cutting tool directly in the mounting shaft, it is secured in an intermediate member, the shaft of which is adapted to be secured in the bore of the mounting shaft. When the mounting shaft is being adjusted, this intermediate member will slide along the face of the boring head in a recess which extends parallel to the sleeve insert. This intermediate member has a plurality of bores, each of which is adapted to receive the shaft of the cutting tool and which are disposed adjacent to each other in a row which extends in the direction of the adjustability of the mounting shaft. Each of these bores in the intermediate member, except the central bore, serves for a coarse adjustment of the cutting tool and increases the range of adjustability of the tool beyond that attainable by the precision adjustment of the mounting shaft. This intermediate member also serves as a cover of the guide slot in the boring head and the sleeve therein to prevent the entry of any dirt or chips into the guide slot and through the latter into the precision adjustment parts.

These objects, features, and advantages of the present invention will become further apparent from the following detailed description thereof, particularly when the same is read with reference to the accompanying drawings, in which—

Figure 2:
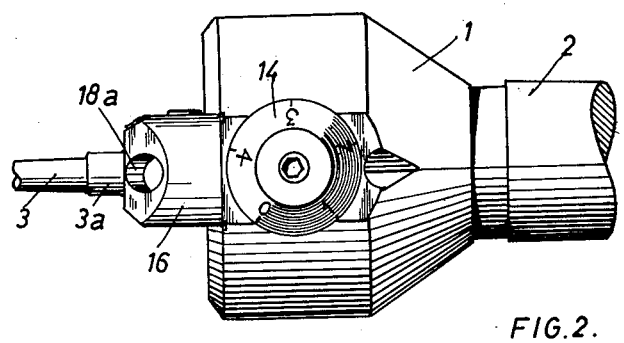

FIGURE 1 shows, partly in cross section, a side view of the boring head according to the invention; while FIGURE 2 shows a side view of the boring head when turned at an angle of 90° about its axis relative to the position shown in FIGURE 1.

Referring to the drawings, the boring head 1 is mounted on a conical shaft 2 and adapted to grip a cutting tool 3. For this purpose, boring head 1 is provided with a large transverse bore into which a sleeve 4 is inserted which is secured therein in any suitable manner, for example, by means of a setscrew. Sleeve 4 has longitudinal slots to form a collet for clamping a tool mounting shaft 5 by being provided with a nut 6 which is likewise slotted longitudinally and will, when tightened, act upon the collet part of sleeve 4 and at the same time become wedged against the wall of the transverse bore in boring head 1.

Shaft 5 is provided with a bore 7 which extends transverse to the direction of adjustment of shaft 5, and is adapted to receive another shaft which may be secured in shaft 5 by means of a setscrew 8 and may consist either of the shaft 3a of cutting tool 3 or, as shown in the drawings, of a shaft 16a of an accessory as subsequently described which, in turn, serves as a means for holding the tool shaft 3a.

Shaft 5 is further provided with a shaftlike extension 9 which carries a washer 10 and on the washer a biased coil spring 11 which acts at the other side against a flange 12 on the end of shaft 9.

Washer 10 has an outer diameter greater than shaft 5 so that its outer edge projects slightly beyond the periphery of shaft 5 and rests on a shoulder 13 at the inside of sleeve 4. A control knob 14 is adapted to be screwed into sleeve 4 so as to act upon the end of extension 9 of shaft 5. Since through washer 10 the biased spring 11 rests with its lower end on sleeve 4, it will be further tightened by control knob 14 so that shaft 5 and its extension 9 will remain in engagement with control knob 14 when the latter is screwed back or loosened. Spring 11 therefore insures that the adjustment of shaft 5 will be carried out entirely without play.

Bore 7 in shaft 5 merges into a guide slot 15 which is provided in sleeve 4 and in boring head 1 and has a length transverse to the axis of boring head 1 in accordance with the extent of the adjustability of shaft 5 which is preferably limited in one direction by the position in which the bore 7 in the shaft 5 extends coaxially with boring head 1 and shaft 2.

In order to attain a very great range of adjustability of the cutting tool, while providing only a very small range of adjustability of shaft 5, the invention further provides an accessory which permits a coarse adjustment of the cutting tool and increases the range of the precision adjustability provided by the device as previously described. This accessory consists of an elongated slide member 16 which has a shaft 16a which in place of shaft 3a of the cutting tool is to be inserted into bore 7 of shaft 5. When shaft 5 is being adjusted along sleeve 4 in boring head 1 by turning control knob 14, member 16 will slide along the face of boring head 1 by being guided by the walls of a recess 17 which extends parallel to sleeve 4. For the mentioned coarse adjustment of the cutting tool, slide member 16 is provided with several bores 18 and 18a into either of which the shaft 3a of cutting tool 3 may be inserted. As indicated in the drawings, bores 18 may extend parallel to the axis of rotation of boring head 1 and at different distances therefrom, or at an inclined angle thereto, as shown by bores 18a. It is also possible to provide both types of bores in the same slide member 16.

Control knob 14 is preferably provided on its outer surface with graduations to permit the extent of an adjustment to be read on fixed marks on the boring head.

Although my invention has been illustrated and described with reference to a preferred embodiment thereof, I wish to have it understood that it is in no way limited to the details of such embodiment, but is capable of numerous modifications within the scope of the appended claims.

What I claim is:
1. In a device of the type described,
    (a) a boring head having a bore therein extending at right angles to the axis of said boring head;
    (b) a slotted elongated sleeve in said bore and rigidly secured to said boring head, said sleeve forming a collet, said bore having an open end and another end, and said collet having an outer conical portion at one end thereof adjacent said open end;
    (c) a tool mounting shaft slidable within said sleeve;
    (d) outer screw threads on said collect adjacent said conical portion thereof;
    (e) a nut having a substantially cylindrical outer surface engaging into the said open end of the bore in said boring head and having inner screw threads and an inner conical portion corresponding to and engaging with the screw threads and the conical portion on said collet, said nut when tightened radially compressing said collect sleeve about said tool mounting shaft, and also pressing radially against the wall of said bore in said boring head;
    (f) said mounting shaft having a transverse bore parallel to the axis of said boring head, said sleeve and the front part of said boring head each having an elongated aperture in a coextensive position and partly coextensive with said transverse bore in said mounting shaft, said aperture and said transverse bore being adapted to receive the shaft of a tool, and said aperture being adapted to permit said mounting shaft with said tool shaft therein to be shifted along the length of said aperture;
    (g) a control knob on the periphery of said boring head and closing the other end of said bore in said boring head, said control knob being threadedly connected to and adjustable in said sleeve longitudinally thereof and adapted to act upon said mounting shaft;
    (h) a spring acting upon said shaft to maintain the same in engagement without play with said control knob during any adjustment of said control knob.
2. In a device as defined in claim 1,
    (i) a slide member having two opposite sides;
    (j) a shaft on one side of said slide member and adapted to be inserted through said elongated aperture into said transverse bore in said mounting shaft;
    (k) means for clamping said slide member shaft in said transverse bore, said slide member having a plurality of bores in different positions in the other side thereof, each of said last mentioned bores being adapted alternatively to receive the shaft of a cutting tool to permit a coarse adjustment of said tool; and
    (l) means for securing said tool in any one of said last bores, the front part of said boring head having a recess therein extending parallel to said sleeve, said slide member being inserted into said recess and guided by the walls thereof and adapted to slide along the front side of said boring head to the extent of the length of said elongated aperture, and also adapted to cover said aperture, said slide member and the tool therein sliding along said recess when said control knob is threadedly adjusted on said sleeve.

References Cited in the file of this patent
UNITED STATES PATENTS

| | | |
|---|---|---|
| 2,209,867 | Wohlhaupter | July 30, 1940 |
| 2,489,719 | Myers | Nov. 29, 1949 |
| 2,654,610 | De Vlieg | Oct. 6, 1953 |

FOREIGN PATENTS

| | | |
|---|---|---|
| 510,851 | Great Britain | Aug. 7, 1939 |
| 232,687 | Switzerland | Sept. 1, 1944 |
| 1,177,116 | France | Dec. 1, 1958 |